(12) United States Patent
Litkouhi

(10) Patent No.: US 8,111,147 B2
(45) Date of Patent: Feb. 7, 2012

(54) LANE DEPARTURE WARNING AND CHANGE ASSIST SYSTEM UTILIZING ACTIVE MATERIALS

(75) Inventor: Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 237 days.

(21) Appl. No.: 12/119,505

(22) Filed: May 13, 2008

(65) Prior Publication Data

US 2009/0284360 A1 Nov. 19, 2009

(51) Int. Cl.
*B60Q 1/00* (2006.01)

(52) U.S. Cl. ........ 340/439; 340/435; 340/903; 701/301; 701/96

(58) Field of Classification Search .......... 340/439, 340/426.31, 435, 438, 463, 465, 471, 903; 701/301, 96, 70, 23, 26, 41; 180/170, 443
See application file for complete search history.

(56) References Cited

U.S. PATENT DOCUMENTS

| | | | | |
|---|---|---|---|---|
| 6,269,307 B1* | 7/2001 | Shinmura et al. | ............. | 701/301 |
| 6,282,478 B1* | 8/2001 | Akita | ............... | 701/70 |
| 6,580,987 B2* | 6/2003 | Sadano et al. | ............. | 701/41 |
| 6,778,890 B2* | 8/2004 | Shimakage et al. | ............. | 701/41 |
| 6,853,884 B2* | 2/2005 | Sadano | ............... | 701/1 |
| 7,391,164 B2* | 6/2008 | Drader et al. | ................. | 315/246 |
| 7,454,291 B2* | 11/2008 | Kawakami et al. | ........... | 701/301 |
| 7,519,464 B2* | 4/2009 | Sakugawa | ........................ | 701/70 |
| 7,542,840 B2* | 6/2009 | Kawakami et al. | ............. | 701/93 |
| 7,561,032 B2* | 7/2009 | Huang et al. | .................. | 340/435 |
| 2002/0040265 A1* | 4/2002 | Sadano et al. | .................. | 701/41 |
| 2002/0175813 A1* | 11/2002 | Ross | .............................. | 340/555 |
| 2003/0014162 A1* | 1/2003 | Sadano | ............................. | 701/1 |
| 2003/0078712 A1* | 4/2003 | Shimakage et al. | ............ | 701/41 |
| 2003/0128106 A1* | 7/2003 | Ross | .............................. | 340/435 |
| 2005/0188690 A1* | 9/2005 | Namuduri et al. | .............. | 60/435 |
| 2005/0212666 A1* | 9/2005 | Kawazoe et al. | ............. | 340/436 |
| 2005/0216161 A1* | 9/2005 | Sakugawa | ........................ | 701/70 |
| 2005/0236210 A1* | 10/2005 | Kawazoe et al. | ............. | 180/272 |
| 2005/0257987 A1* | 11/2005 | Bohm et al. | .................. | 180/419 |
| 2005/0267684 A1* | 12/2005 | Kawakami et al. | ........... | 701/301 |
| 2005/0273262 A1* | 12/2005 | Kawakami et al. | ........... | 701/301 |
| 2005/0288842 A1* | 12/2005 | Brewer et al. | .................. | 701/70 |
| 2006/0028051 A1* | 2/2006 | Brei et al. | ................. | 296/187.04 |
| 2006/0069481 A1* | 3/2006 | Kubota et al. | .................. | 701/41 |
| 2006/0129291 A1* | 6/2006 | Lu et al. | .......................... | 701/36 |
| 2006/0259221 A1* | 11/2006 | Murty et al. | ..................... | 701/41 |
| 2006/0267750 A1* | 11/2006 | Lu et al. | .......................... | 340/440 |
| 2006/0284839 A1* | 12/2006 | Breed et al. | ..................... | 345/156 |
| 2007/0069874 A1* | 3/2007 | Huang et al. | .................. | 340/435 |
| 2008/0107304 A1* | 5/2008 | Coulter et al. | ................. | 382/103 |
| 2008/0208416 A1* | 8/2008 | Yuet et al. | ........................ | 701/50 |
| 2009/0009305 A1* | 1/2009 | Kataoka et al. | ............... | 340/435 |

\* cited by examiner

*Primary Examiner* — Hoi Lau

(57) ABSTRACT

A lane change assist and/or lane departure warning system adapted for use with a vehicle having a module engaged by an operator, wherein the vehicle travels within a lane, and the system includes a steering wheel sensor, at least one sensor operable to detect a lane-marking or an approaching object in adjacent lanes in the direction of host vehicle travel, a warning device including an active material element engaged with the module, and a controller communicatively coupled to the sensor and device and configured to determine a spatial relationship between the vehicle and the lane-marking or approaching object in the direction of host vehicle travel, compare the relationship to a threshold, transmit an activation signal to the element when the relationship exceeds the threshold or when an object is detected and the wheel sensor indicates a turn towards the object, and generate an alert by activating the element.

18 Claims, 6 Drawing Sheets

LANE DEPARTURE WARNING AND CHANGE ASSIST SYSTEM UTILIZING ACTIVE MATERIALS

BACKGROUND OF THE INVENTION

1. Technical Field

The present invention relates to lane departure warning and lane change assist systems adapted for use with a vehicle, and more particularly, to a lane departure warning and lane change assist system that utilizes active material activation, and more preferably, utilizes a Magneto-Rheological Hydraulic Power Steering (MR-HPS) system to effect warning.

2. Background Art

Lane departure warning and lane change assist (LDW/LCA) systems have been developed to assist operators (i.e. drivers) in maintaining proper lane alignment by alerting the operator to a possible unintentional lane departure and/or autonomously acting to keep the vehicle within the lane. Unlike scarifications and other measures commonly found on thoroughfare shoulders that alert the operator only after he or she has traversed the lane-marking, LDW systems provide timely warnings prior to lane departure. Lane change assist systems warn the driver of an approaching vehicle traveling in the direction of the host vehicle in the adjacent lanes when a lane change by the driver could pose a potential danger. Further, LDW/LCA systems offer effective warning alerts for vehicles in central lanes, wherein shoulder methods would be ineffective.

These LDW systems typically utilize at least one radar/lidar, DGPS/INS and digital map, or camera/video processing sensor to detect the lane markings (or road edges) that delineate a lane boundary. The detected lane-marking range is typically used to determine the lateral position of the vehicle in the lane (i.e., vehicle in-lane position), and a parameter time-to-lane-crossing (TTLC) is calculated based on the in-lane position and the motion of the vehicle. If the TTLC is smaller than a predefined threshold, a warning is typically issued. Other lateral support systems, such as lane keeping (LK) systems, have similarly been developed.

A combination of haptic and visual means, wherein the visual alert is secondary, has been found to present an effective modality of warning a human operator. A common type of haptic alert is to use a haptic seat; this type of system, however, has been found to add to the cost of the vehicle. A second effective haptic alert is to vibrate the steering wheel. In this configuration, EPS (Electric Power Steering) or EHPS (electro-hydraulic power steering) are conventionally used to generate steering vibration; however, these systems also add to the cost, and often require high peak electric current and/or voltage. In addition, it is appreciated that a steering torque in the opposite direction caused by the electric motor may cause a wrong reaction from the driver.

MR-HPS systems have been recently implemented to provide more energy efficient and adjustable power steering control in comparison to traditional hydraulic, EHPS or EPS embodiments. This type of power steering system utilizes a low current coil to generate a magnetic field across a reservoir of MR fluid, which causes a reversible change in the viscosity of the fluid, and thereby controls the pump speed. By controlling the torque (proportional to current) as a function of vehicle speed, the variable power assist is obtained. It is appreciated that using an MR-HPS system improves fuel economy approximately 0.5 mpg for automobiles and 0.3 mpg for trucks, provides variably and adjustably assisted steering, reduces pump parasitic losses as well as costs associated with EHPS, eliminates the high peak electric current and voltage demands associated with EPS/EHPS, and finally, reduces mass due to the elimination of electric components, such as a motor.

SUMMARY OF INVENTION

The present invention utilizes an active material element, and more preferably, the activated response of an MR-HPS system to provide a haptic warning to an operator through the steering wheel. Thus, an improved lane departure warning and lane change assist system is presented that utilizes the reversibility of active materials to drive a haptic alert instead of an electric motor or a purely hydraulic system.

Among other things, the novel system is useful for reducing the likelihood of accidents caused by improper (i.e., unintended and/or dangerous) lane changes. A preferred embodiment of the system is further configured to provide a lane departure warning system that receives operator or vehicular input and terminates the production of the warning based on the input.

A first aspect of the present invention concerns a lane-departure warning and/or lane change assist system adapted for use by an operator and with a vehicle traveling within a lane delineated by at least one lane-marking. The system includes at least one sensor operable to detect the location of the lane-marking or object relative to the vehicle, and a controller communicatively coupled to the sensor. The controller is configured to execute a warning algorithm, wherein the controller determines a spatial relationship between the vehicle and lane-marking, compares the relationship to a predetermined threshold, and causes an activation signal to be generated when the threshold is exceeded or an object is detected. Finally, a warning device having an active material element coupled to the controller is included and configured to generate an alert when the element is activated by the signal.

As such, a second aspect of the invention concerns a method of alerting the operator to an improper lane change, wherein the vehicle includes a module engaged by the operator. The method includes securing an active material relative to the module, such that a reversible characteristic of the material causes a module condition detectable by the operator. Next, the existence of an approaching vehicle in the direction of host vehicle travel in an adjacent lane is determined so as to further determine a spatial relationship between the host vehicle and the approaching vehicle. In addition, the position of a lane-marking relative to the host vehicle can also be determined, so as to further determine a spatial relationship between the marking and host vehicle. Then, the relationship is compared to a threshold, an activation signal is generated when the relationship exceeds the threshold, and the signal is transmitted, so as to active the material. The characteristic is thereby changed by activating the material, and the module condition is modified by changing the characteristic. Finally, the operator is alerted through the change in module condition.

It will be understood and appreciated that the present invention provides a number of advantages over the prior art, including, for example, providing a readily implemented system in vehicles having existing MR-HPS systems, and avoiding the additional cost for warning generation. The inventive system provides the benefits of lowering energy consumption to effect a warning, thereby reducing the load upon the charging system, increasing reliability by reducing the number of moving parts, reducing the mass of the vehicle by eliminating electro-mechanical components, and providing modality in preventing improper lane changes, in comparison to conventional electrically driven steering wheel warning (e.g., vibration) systems.

Other aspects and advantages of the present invention including receiving operator and/or vehicular input, and modifying or terminating the warning algorithm according to the input, will be apparent from the following detailed description of the preferred embodiment(s) and the accompanying drawing figures.

BRIEF DESCRIPTION OF DRAWINGS

Preferred embodiment(s) of the invention are described in detail below with reference to the attached drawing figures, wherein.

DETAIL DESCRIPTION OF THE INVENTION

The present invention concerns an improved lane departure warning and/or lane change assist system 10 adapted for use with a host vehicle 12 traveling within a lane (e.g., of a thoroughfare or road), and by a human operator 14 (FIGS. 1 and 2), wherein the lane may be delineated by at least one lane-marking 16. The system 10 is described and illustrated herein with respect to an automobile, however, it is certainly within the ambit of the present invention to utilize the system 10 with other lane-based transportation machines, such as boats and airplanes taxiing on runways. As used herein, the term "lane-marking" includes visible elements such as highly reflective paint or thermoplastic stripes (whether in continuous or dashed line-type), curbs, medians, reflectors, and otherwise distinguishable edges of pavement, or invisible elements embedded under pavement such as magnetic elements. The system 10 is configured to detect the position of the vehicle 12 relative to a lane marking 16 of interest (i.e., the nearest and/or approaching lane marking).

Figure 1:
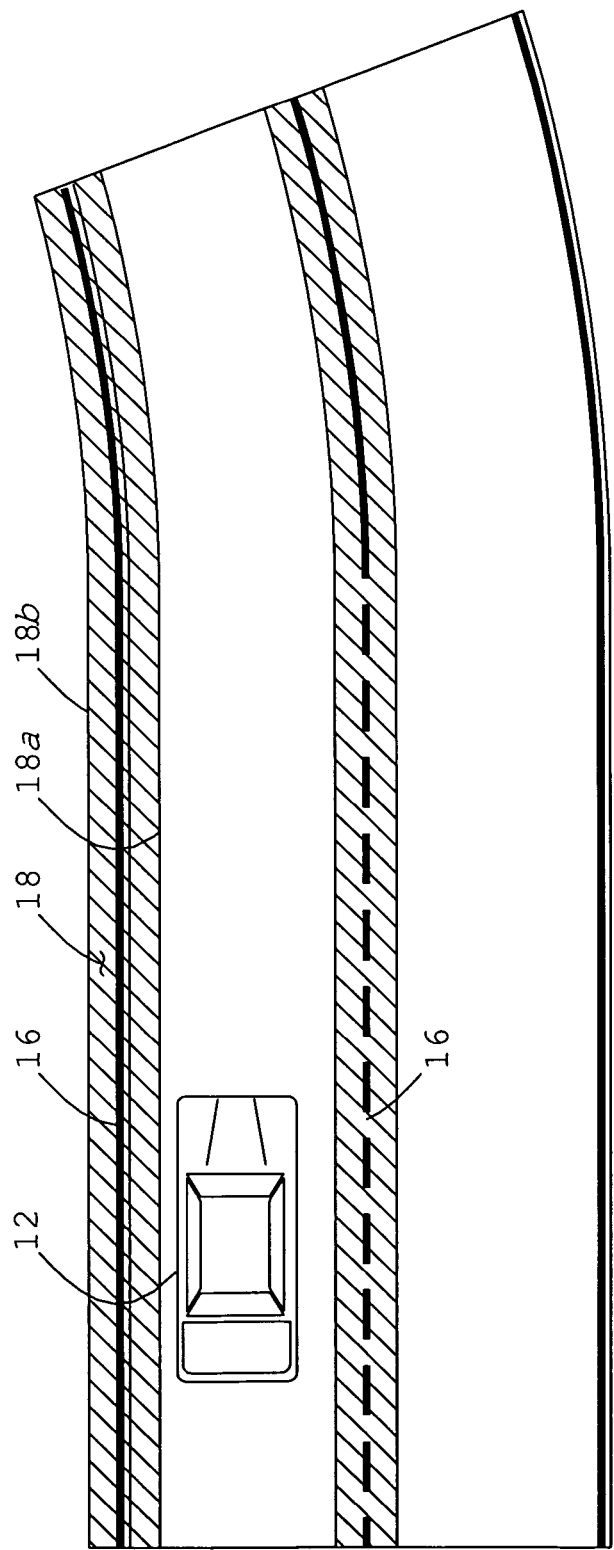
FIG. 1 is a plan view of a vehicle traveling within a lane, particularly illustrating lane-markings and an exemplary warning zone, in accordance with a preferred embodiment of the present invention.
Figure 2:
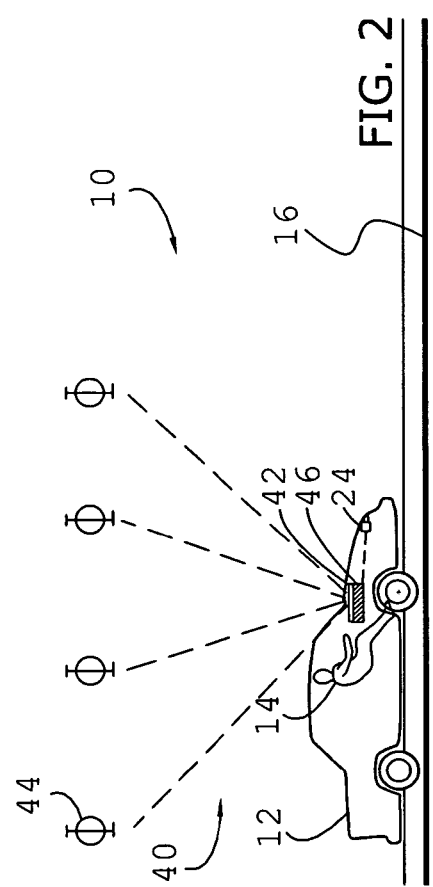
FIG. 2 is an elevational view of a vehicle traveling within a lane, particularly illustrating a lane-marking, operator, and DGPS system, in accordance with a preferred embodiment of the present invention.

More particularly, the system 10 is configured to determine a spatial relationship, such as the distance between the lane-marking 16 and vehicle 12 (as measured from the sensor position), the time-to-lane-cross (TTLC) relative to the marking 16, or the change in distance between the vehicle 12 and approaching traffic adjacent the vehicle 12. If the relationship exceeds a predetermined warning threshold (i.e., the distance or TTLC is less than a predefined safe value), the system 10 is configured to alert the operator 14 to a potential improper lane change or lane deviation. The system 10 is further configured to deactivate the warning, once the vehicle 12 has completed the lane change or a warning compression criteria is activated, and as such, more preferably presents a warning zone 18 defined by earliest and latest warning lines 18a,b (FIG. 1).

Figure 3:
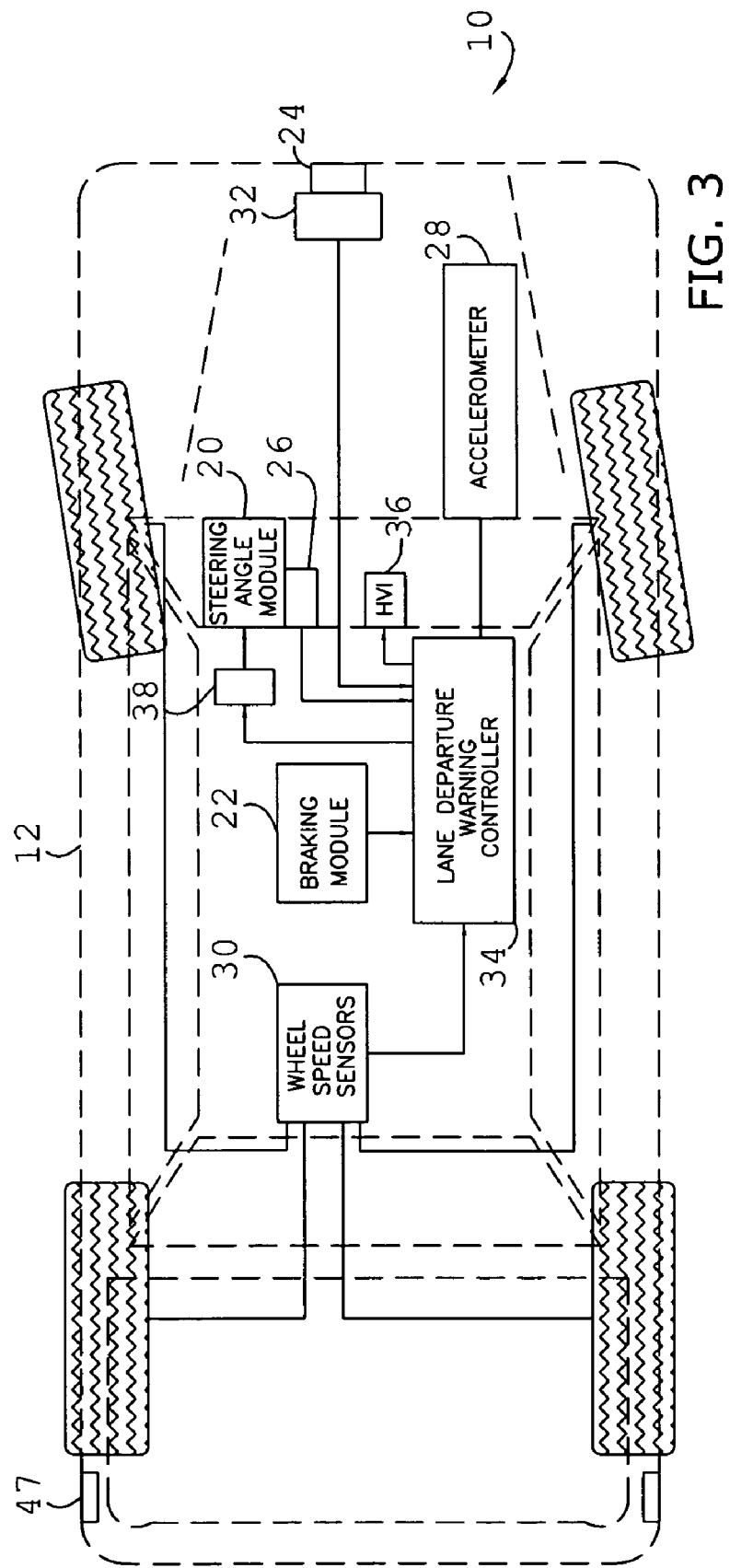
FIG. 3 is a plan view of a host vehicle having implemented a preferred lane-departure warning system, in accordance with the present invention, particularly illustrating the general components of the system.

In a preferred embodiment, the host vehicle 12 is further equipped with steering wheel and braking modules 20,22 as are conventionally known in the art; and the system 10 includes a forward-looking camera 24, a steering angle sensor 26, an accelerometer 28, wheel speed sensors 30, a video/image-processing unit 32, a warning algorithm controller 34, and a human-vehicle interface (HVI) 36 (FIG. 3). Finally, the system 10 is drivenly coupled to and the vehicle 12 further includes a magneto-rheological hydraulic power steering subsystem (MR-HPS) 38 that is configured to engage, so as to provide adjustable steering assistance to, the steering wheel module 20.

The controller 34 is configured to perform a warning algorithm that starts by reading operator and/or vehicular input regarding system operation (e.g., on/off, driving style, threshold limits, etc.). Next the controller 34 receives sensory data, such as frames of vision images from the camera 24, signals from exterior object (e.g., blind-spot) sensors, and signals from on-board condition sensors, such as the accelerometer 28. In this configuration, for example, an image-processing sub-routine is then performed to identify lane markings 16 within the vision image data. If no markings are determined, it is within a preferred embodiment of the invention to utilize default markings, virtually positioned at a predetermined maximum lateral spacing from the vehicle. As such, the preferred system 10 is further configured to determine the in-lane position of the vehicle 12, and preferably the centerline of the traveled lane.

To that end, in addition to or lieu of the forward-looking camera 24, a Global Positioning System (GPS) 40 communicatively coupled to the controller 34 is preferably included. The GPS 40 is used to provide the absolute position of the vehicle in earth inertial coordinates, utilizing a receiver 42 and at least four communicating satellites 44 (FIG. 2), as is known in the art. The vehicle heading and in-lane position can be further determined using a map database 46, whereby the GPS 40 correlates the coordinates of each position with one of a plurality of map position points. Alternatively, other signal sources located at control points could be communicatively coupled to the receiver 42, and other coordinate systems based on a variety of geodetic datum, units, projections, and references could be utilized to pinpoint the vehicle 12.

The database 46 preferably includes a plurality of digital maps built from GPS data of actual geographic roadways and thoroughfares. The preferred database 46 further includes and is cooperatively configured to provide the controller 34 with precise lane-marking locations. To that end, at least a portion of the points preferably include ID links that enable correlation with indicia conveying an actual condition of the thoroughfare at the given location. In this configuration, the indicia preferably include the identification of a lane-marking point, and/or roadway heading at the point. Where the database 46 includes only thoroughfare pavement boundaries, the indicia may include a description of the thoroughfare (e.g., "3N2S," for a description of three north bound and two southbound lanes) that could be utilized by the controller 34 to estimate lane-marking locations. Finally, the database 46 may be stored in the system 10 by conventional storage means, such as a DVD-ROM, internal hard disk, or removable memory card, and/or periodically updated through wireless communication with a third party.

Where TTLC is to be determined, the wheel speed sensors 30 may be used to provide the vehicle velocity, and the TTLC is determined based on the in-lane position of the vehicle 12 and its velocity. If the TTLC exceeds the predetermined threshold, a warning is caused to be issued; otherwise, the algorithm resets and new data is received preferably on a continuous basis, as it is appreciated that lane changes/deviations usually occur over short durations.

With respect to lane change assist, it is appreciated that the preferred system 10 is further operable to deliver the warning to the operator 14 when a dangerous lane change is detected. In this regard, a lane-marking 16 is not considered; rather the system 10 utilizes at least one active sensor 47, such as a lidar or radar device, including a signal processing unit. Each active sensor 47 is oriented and configured to detect an object (not shown) preferably within a vehicle "blind spot," (e.g., the space exterior the rear quarter panels of the vehicle 12) as appreciated by those of ordinary skill in the art. As such, each sensor 47 is communicatively coupled and provides input to the controller 34. The dangerous maneuver is determined when the presence of an object is detected in and the steering wheel 20a is turned towards a blind spot.

When an improper lane change, lane deviation or otherwise dangerous maneuver is predicted, the present invention utilizes an active material to generate the warning alert by inter-engaging the material and operator 14 through an existing vehicle module. As used herein, the term "active material" (AM) shall mean any material or composite that undergoes a reversible fundamental (e.g., intensive physical, chemical, etc.) property change when activated by an external stimulus or signal, as this term is understood and defined by those of ordinary skill in the art. It is appreciated that this category of materials includes, but is not limited to, shape memory alloys/polymers/ceramics, electroactive polymers (EAP), piezoelectric materials, nano material, magneto-rheological (MR) elastomers and fluids comprising the same, and electro-rheological (ER) elastomers and fluids comprising the same. The invention encompasses utilizing the reversible shape, stiffness, spring modulus, shear strength or otherwise fundamental change of any "active material" to effect a lane-departure warning, and the termination of the warning by reversing the change.

More particularly, with respect to the present invention, magneto-rheological (MR) elastomers are a group of smart materials whose modulus can be controlled by the application of an external magnetic field. MR elastomer materials include, but are not limited to, an elastic polymer matrix comprising a suspension of ferromagnetic or paramagnetic particles. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like.

The particle size should be selected so that the particles exhibit multiple magnetic domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR elastomer composition.

Figure 4:
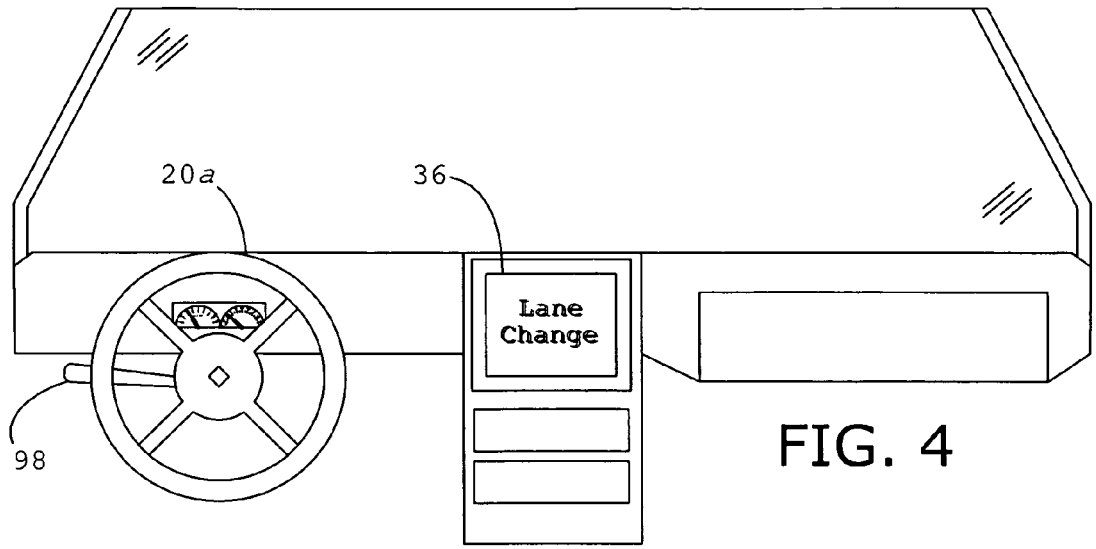
FIG. 4 is an elevational view of the interior of a vehicle, particularly illustrating a steering wheel and HVI monitor, in accordance with a preferred embodiment of the invention.

In the illustrated embodiment, the active material is the magneto-rheological (MR) fluid 48 of the MR-HPS 38. When the warning threshold is exceeded, a primary warning is generated, whereby the operator 14 is alerted through haptic means via the steering wheel module 20. The controller 34 and MR-HPS 38 are cooperatively configured to distinctly alter the level of steering assist and change the stiffness of the steering wheel 20a, when an improper lane change is detected (compare, FIGS. 5a and 5b). More preferably, the preferred system 10 is configured such that the HVI device 34 also produces a visual and/or audible secondary warning, such as an alarm sound or graphic display on a monitor (FIG. 4). Once generated, the warning or alert may be terminated by discontinuing the activation signal when the algorithm ceases to predict an improper lane change, or automatically after a timer (not shown) counts down a predetermined warning period.

Figure 5:
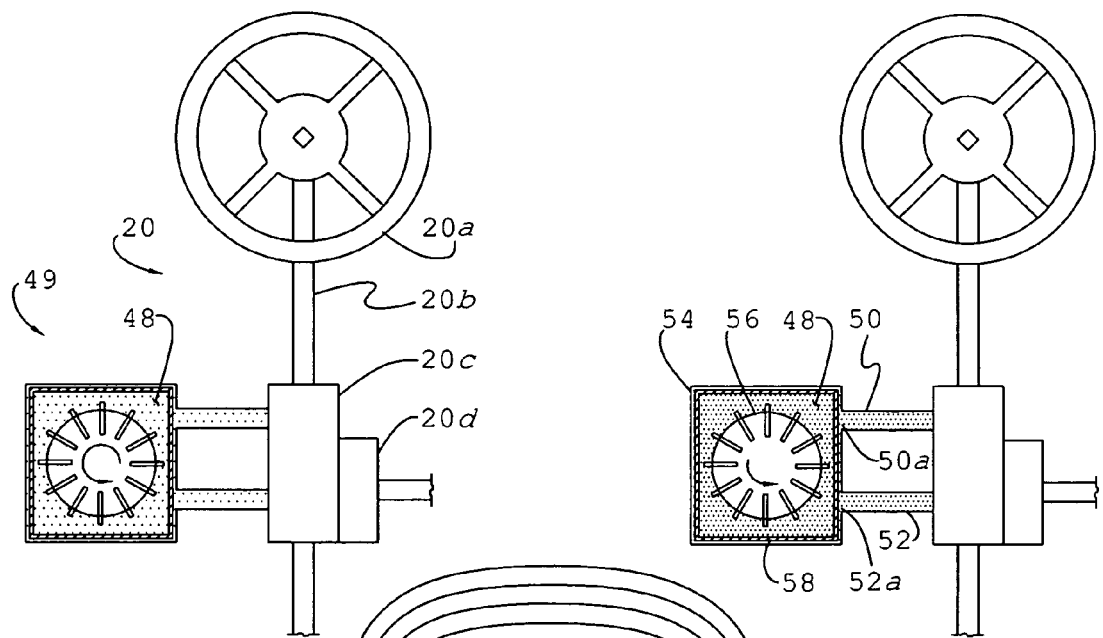
FIG. 5 is a generalized elevational view of a steering column, and modified MR-HPS system, particularly illustrating the MR fluid and low current coil.
Figure 5B:
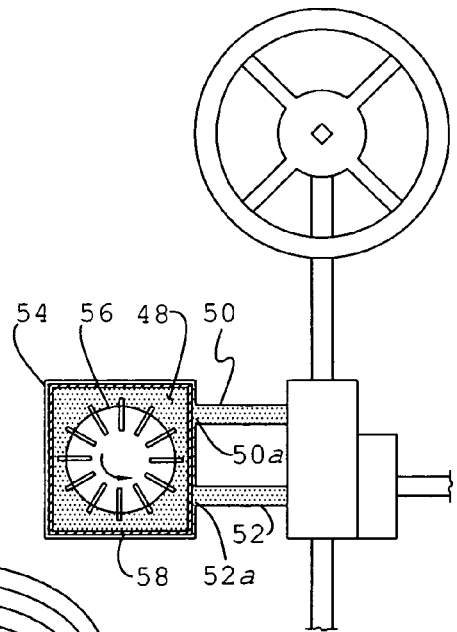
FIG. 5b is a generalized elevational view of the steering column and MR-HPS system shown in FIG. 5, after activation of the MR fluid.

A simplistic elevational view of a combined pump/MR-HPS unit 49 engaging the steering column 20b of the vehicle 12 is exemplarily shown in FIGS. 5-5b. In this configuration, the MR-HPS system 38 is presented by the inventive pump/MR-HPS unit 49 which is configured to engage the rotary valve 20c and steering gear 20d of the steering module 20 through securely connected fluid inlet and outlet conduits 50,52. The pump/MR-HPS unit 49 includes a housing 54 for storing a reservoir of MR fluid 48 and a rotary vane element 56 that is connected to the engine via a pulley and belt (not shown); said connection to the conduits 50,52 defining an inlet 50a and outlet 52a, respectively. The element 56 causes the fluid 48 to flow from the inlet 50a and to the outlet conduit 52, creating a low-pressure vacuum adjacent the inlet 50a and a high-pressure build-up at the outlet 52a. A pressure release valve (also not shown) is preferably provided to prevent the pressure build-up from becoming excessive at high vehicle speeds.

Figure 5A:
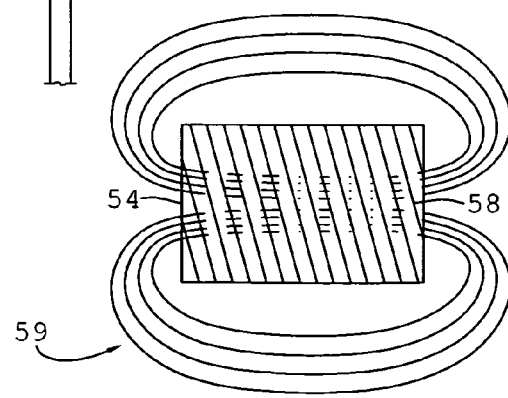
FIG. 5a is a side elevational view of the fluid pump shown in FIG. 5, particularly illustrating the coil.

A low current coil 58 formed of conductive wire encircles at least a portion of the fluid 48 and is configured to generate a magnetic field when an electric current is passed therethrough. More preferably the coil runs within the walls of the housing chamber so as to encircle the entire fluid reservoir, excluding the fluid within the steering module 20 and conduits 50,52. FIG. 5*a* shows a preferred configuration, wherein the coil 58 co-extends with the housing 54. It is appreciated that the number of turns in the coil 58 is proportional to the strength of the magnetic field 59 for a given current flow, and as such, a greater number of turns is preferred in order to reduce the required current load. Thus, the coil 58 and housing 54 are cooperatively configured such that the MR fluid 48 passes through the magnetic field 59, so that it is caused to undergo a change in viscosity.

Figure 6:
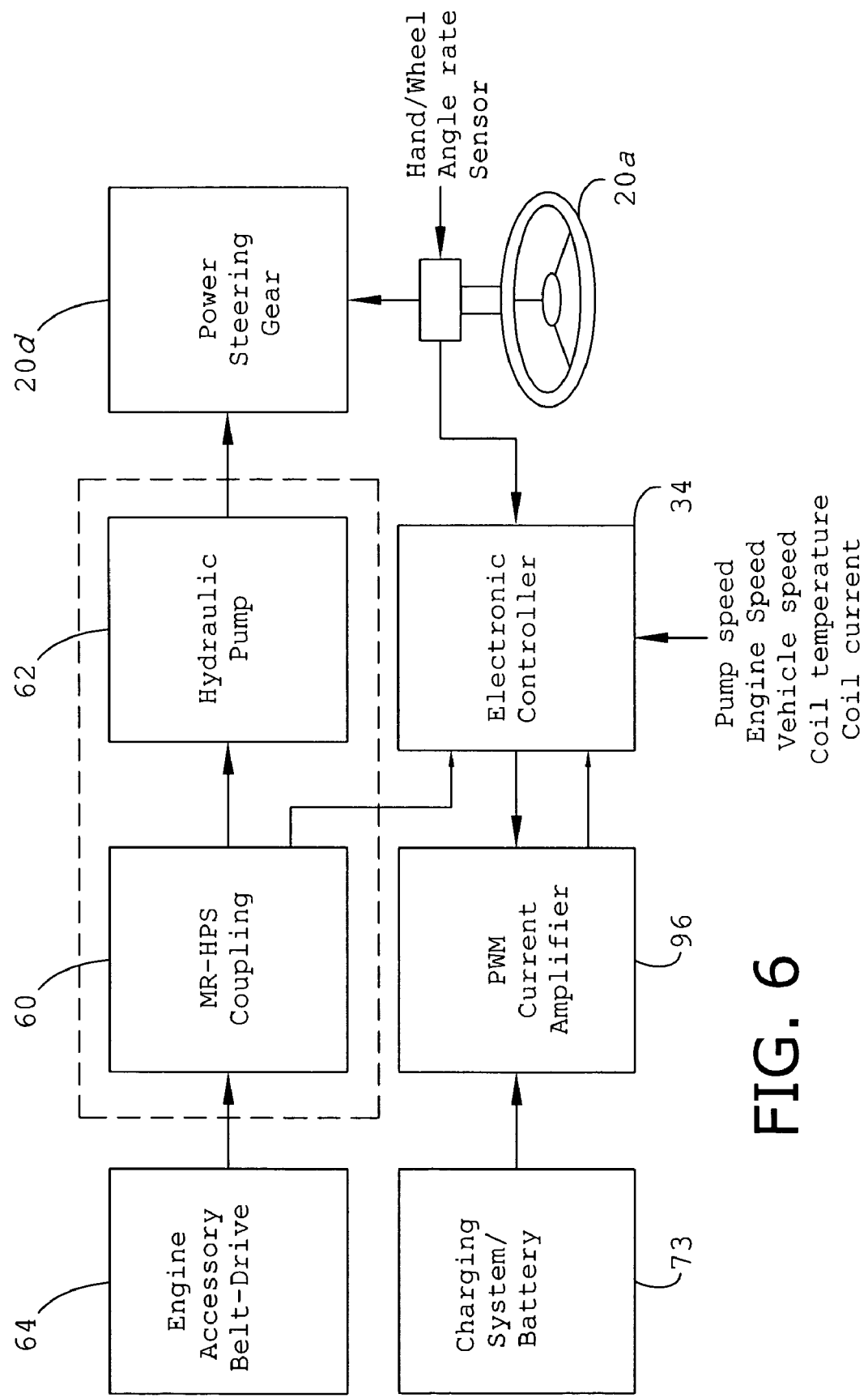
FIG. 6 is a schematic diagram of the system 10, particularly illustrating an MR-HPS coupling, a hydraulic power steering pump module, engine accessory belt-drive, controller, amplifier, and power source, in accordance with a preferred embodiment of the invention.
Figures 7, 8:
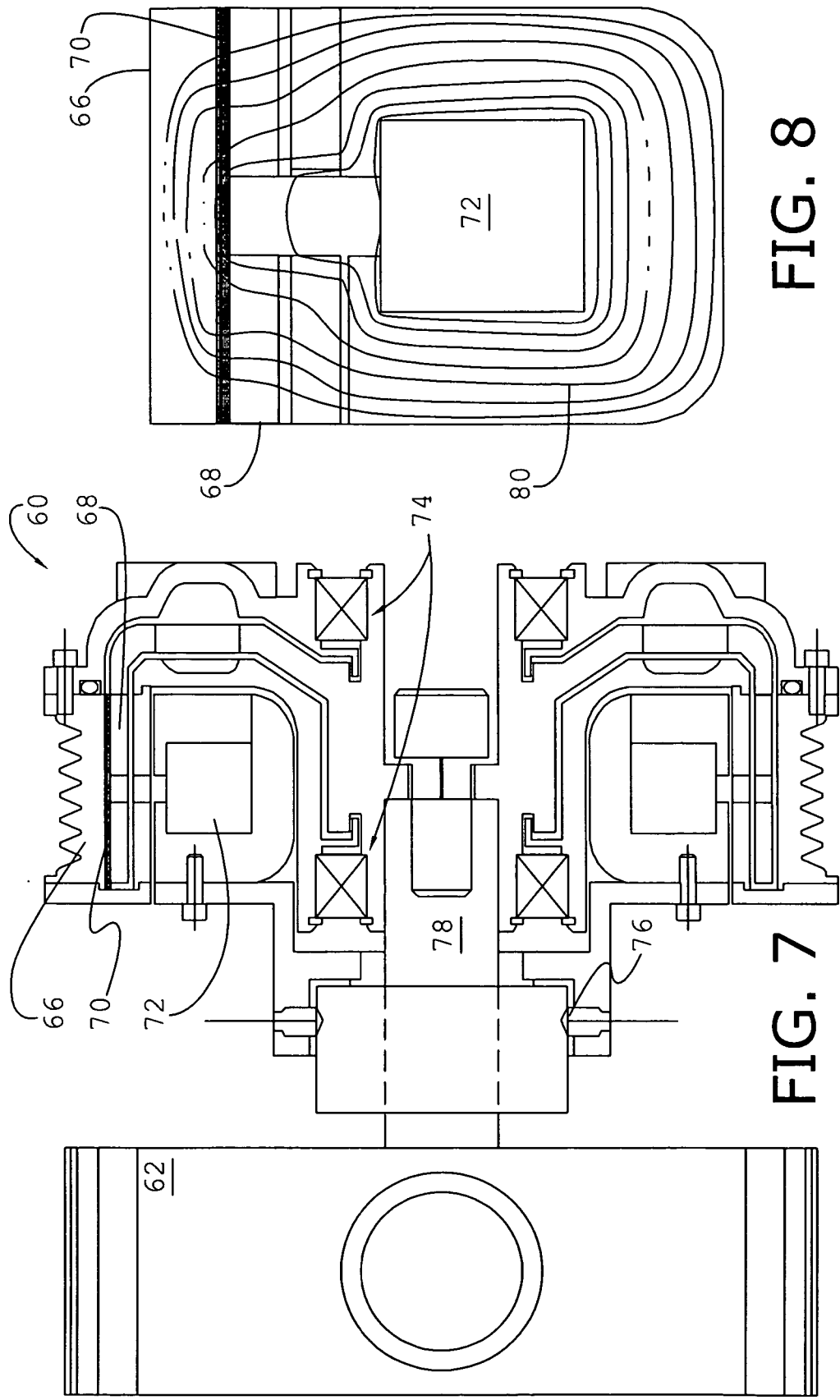
FIG. 7 is a cross-sectional view of an MR-HPS coupling having inner and outer rotors, a low current coil, and a layer of MR fluid stored between the inner and outer rotors, in accordance with a preferred embodiment of the invention.
FIG. 8 is a schematic plan view of the coil shown in FIG. 7, particularly illustrating magnetic field lines generated when a current is passed through the coil.

More preferably, and as shown in FIGS. 6 and 7, the system 10 utilizes a conventional coupling 60 that presents the MR-HPS system 38 and interconnects a separate hydraulic pump 62 and an engine accessory belt-drive 64 (FIG. 6), as is known in the art. This enables the system 10 to be readily implemented in pre-existing vehicles, simply by retrofitting vehicles 12 having an existing MR-HPS coupling with program logic. In FIG. 7, an exemplary MR-HPS coupling 60 is shown in cross-section, particularly illustrating an outer rotor 66, an inner rotor 68, a layer of MR fluid 70 intermediate the outer and inner rotors 66,68, a stationary coil 72 connected to the charging system (e.g., battery) 73 of the vehicle 12, and rotor and pump shaft bearings 74,76 that reduce energy loss and heat generation.

In operation, it is appreciated that the outer rotor 66 coupled to the engine accessory belt drive 64 provides the input to the coupling 60; shearing/frictional force between the MR fluid 70 and rotors 66,68 enable the input torque to be transferred to the inner rotor 68. The inner rotor 68 is in turn coupled to the hydraulic pump shaft 78, which drives the pump 62. Finally, the level of steering assist is controlled by changing the shearing/frictional force of the fluid 70 by causing an electric current to flow through the coil 72, which in turn generates an electromagnet defining a magnetic field 80. More particularly, it is appreciated that an increase in current (proportional to magnetic flux) streamlines the iron particles in the fluid 70 and makes the clutch connection more "solid", which increases the pump speed (closer to engine-pulley speed). The increase in pump speed, in turn, provides more power assist and more load on the engine. When the current delivered to the coupling 60 is reduced, solidity is also reduced as the MR fluid becomes less viscous, which reduces the pump speed and stiffens the steering. Thus, as shown in FIG. 8, the magnetic filed 80 presents a flux density at the layer of MR fluid 70 greater than a minimum density necessary to activate the material. The afore-described change experienced by the MR fluid 70 causes the torque delivered to the pump 62 and thereby the assistance experienced by the operator 14 to change.

Figure 9:
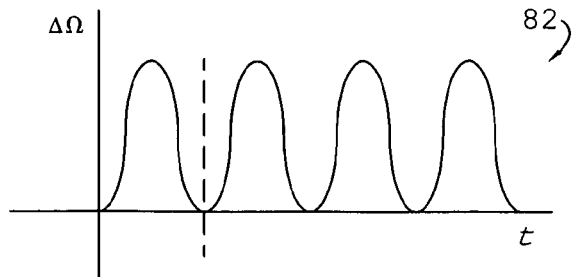
FIG. 9 is a line diagram depicting a sinusoidal activation signal profile, in accordance with a preferred embodiment of the invention.
Figure 9A:
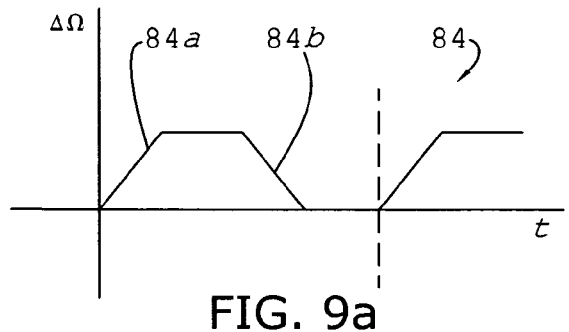
FIG. 9a is a line diagram depicting a trapezoidal activation signal profile, having ramp up and down periods, in accordance with a preferred embodiment of the invention.

In the present invention, the level of assist (stiffness) is varied based on an input signal produced by selected logic stored on the controller 34. It is appreciated that MR-HPS coupling 60 can be locked within 40 ms, which allows for a fast haptic cue based upon a variety of signal profiles (or schemes). For example, a sinusoidal actuation signal 82 (FIG. 9) defining a frequency and a change in resistance (ΔΩ) amplitude may be transmitted from the controller 34 to the MR-HPS coil (58 or 72) depending upon the warning algorithm conclusion. It is also appreciated that this profile generates a distinctive pulsating resistance to turning the steering wheel 20*a*. It should be noted, however, that the change in resistance amplitude is representative of an opposite reduction in current, such that an initial change in resistance amplitude of zero is realized by leaving unaltered the current delivered to the MR-HPS coupling 60 under normal operation.

Figure 9C:
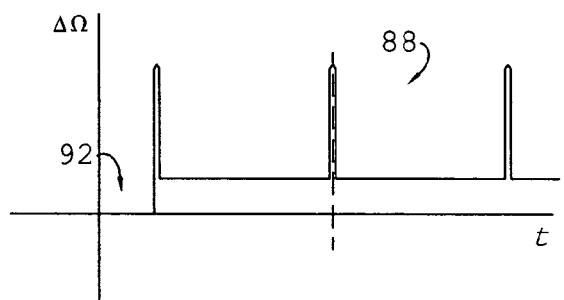
FIG. 9c is a line diagram depicting a periodic spike activation signal profile, in accordance with a preferred embodiment of the invention.
Figure 9B:
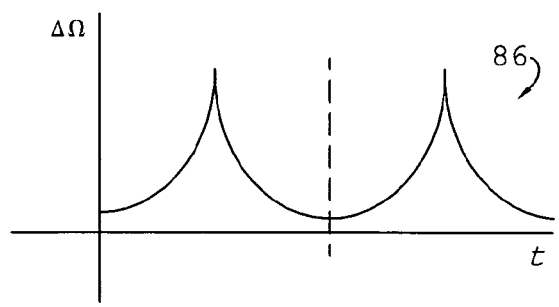
FIG. 9b is a line diagram depicting a parabolic activation signal profile, in accordance with a preferred embodiment of the invention.
Figure 9D:
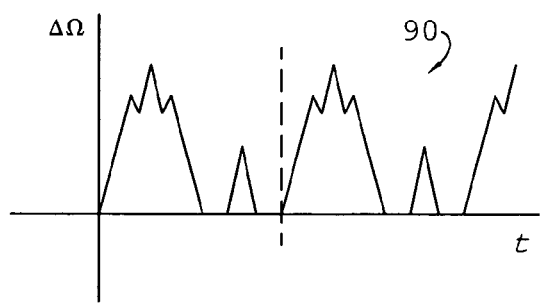
FIG. 9d is a line diagram depicting a double spike activation signal profile, in accordance with a preferred embodiment of the invention.
Figure 9E:
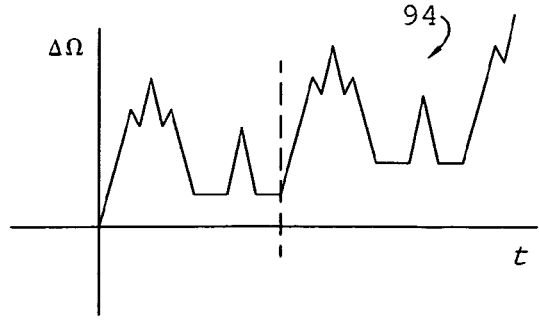
FIG. 9e is a line diagram of the profile shown in FIG. 6d, wherein the wave cycles are stair-stepped to provide increasing amplitude.

As exemplarily shown in FIGS. 9*a-e*, other signal profiles may be generated as well. For example, a more gradually increasing trapezoidal profile 84 (FIG. 9*a*), including ramp up and down sections 84*a,b* can be produced to generate an increasingly stiff resistance that plateaus at a predetermined level, sustains the maximum resistance for a period, and then gradually reduces the stiffness. Likewise, a parabolic profile 86 (FIG. 9*b*) can be produced that also provides a more gradual change in feel. FIG. 9*c* shows a periodic spike profile 88 that produces a sudden change in the resistance to steering wheel rotation; this configuration it is appreciated provides faster and increased control of the steering wheel 20*a*; and similarly, FIG. 9*d* presents a multiple spike or "mountainous" profile 90 that seems to present the operator 14 with a randomly stiffening steering wheel 20*a*. As shown in FIG. 9*c*, the signal may include an initial dead-zone 92, wherein power steering assistance is delivered from the MR-HPS system (38 or 60) and to the pump 62 unaltered. Finally, and as shown in FIG. 9*e*, a profile 94 presenting increasing stair steps in amplitude that eventually requires great effort from the driver to turn the wheel 20*a*, may also be produced, if so desired.

In yet another preferred embodiment of the invention, the system 10 is configured to determine when the vehicle 12 is approaching or traversing a curved lane and modify (e.g., amplify) the algorithm and/or input signal accordingly. For example, the GPS 40 and map database 46 may include indicia of curve profile beginning and ending station data; or the camera 24 and video/image-processing unit 32 may be configured to further distinguish curved from generally straight lane-markings 16. More particularly, where a lane is deemed curved, the controller 34 is preferably configured to modify the algorithm to accommodate the change in steering wheel angle necessary to travel along the center line of the lane, and/or configured to amplify the signal, as it is appreciated that lane traversal when navigating a curve is more responsive to wheel angle. FIG. 6 schematically shows an amplifier 96 interconnecting the controller 34 and MR-HPS system 38 or 60. The amplifier 96 may be powered directly from (or connected to the battery 73 as illustrated) and activated by the controller 34 upon the finding of a curved lane.

Finally, as previously mentioned, the preferred system 10 is configured to return the MR-HPS system 38 to its normally functioning mode, upon receipt of an input from the operator 14. For example, the controller 34 may be configured to return the MR-HPS 60 to its normal function, once it detects a large steering effort from the operator 14, actuation of a turn signal 98, the application of the braking module 22, or other warning suppression criteria.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventor hereby states his intent to rely on the Doctrine of Equivalents to determine and assess the reasonably fair scope of the present invention as pertains to any system or method not materially departing from but outside the literal scope of the invention as set forth in the following claims.

What is claimed is:

1. An active material based lane-departure warning system adapted for use by an operator and with a vehicle traveling within a lane delineated by at least one lane-marking, said system comprising:
    at least one sensor operable to detect the location of the lane-marking relative to the vehicle;
    a controller communicatively coupled to the sensor, and configured to execute a warning algorithm, wherein a spatial relationship between the vehicle and lane-marking is determined, the relationship is compared to a predetermined threshold, and an activation signal is caused by the controller to be generated when the threshold is exceeded; and
    a warning device including an active material element operable to undergo a reversible change in property when exposed to or occluded from the activation signal, and communicatively coupled to the controller,
    said device and controller being cooperatively configured to generate an alert as a result of the element being activated by the signal; wherein the device includes an Magneto-Rheological Hydraulic Power Steering system, the element is Magneto-Rheological fluid housed and circulated within the MR-HPS system, and the device is configured to change the viscosity of the fluid when the signal is generated.

2. The system as claimed in claim 1, wherein the warning device and the change causes a haptic alert when the element is activated.

3. The system as claimed in claim 1, wherein the signal is an electric current and presents a profile having a modifiable amplitude and frequency, the device further includes a low current coil operable to generate a magnetic field when an electric current is passed therethrough, the controller is configured to cause the signal to pass through the coil when the threshold is exceeded, so as to generate the field, and the fluid engages and undergoes a reversible change caused by the field.

4. The system as claimed in claim 3, wherein the signal presents a trapezoidal profile having ramp up and down sections.

5. The system as claimed in claim 3, wherein the signal presents a periodic spike profile.

6. The system as claimed in claim 3, wherein the signal presents an initial dead-zone.

7. The system as claimed in claim 3, wherein the signal presents a stair stepped profile having an increasing amplitude.

8. The system as claimed in claim 1, further comprising:
    an input device communicatively coupled and configured to transmit an input to the controller,
    said controller being further configured to terminate the warning algorithm upon receipt of the input.

9. The system as claimed in claim 8, wherein the vehicle includes a braking module, and the input is the application of the braking module.

10. The system as claimed in claim 8, further comprising:
    a timer communicatively coupled to the controller and configured to measure the passage of a period upon the generation of the alert,
    said timer and controller being cooperatively configured to terminate the alert upon the passage of the period.

11. The system as claimed in claim 1, wherein said at least one sensor is a vision sensor including a camera and image processing unit.

12. The system as claimed in claim 1,
    said spatial relationship being the time-to-lane-crossing (TTLC), as measured between the vehicle and lane-marking.

13. The system as claimed in claim 1, further comprising:
    at least one condition sensor configured to determine a current vehicle or lane condition,
    said controller being communicatively coupled to said at least one vehicle condition sensor, and further configured to modify the threshold based upon the condition.

14. The system as claimed in claim 13, further comprising:
    a plurality of condition sensors including a steering angle sensor, an accelerometer, a GPS and map, and a wheel speed sensor.

15. An active material based lane change assist system adapted for use with a vehicle traveling within a lane and having a steering wheel, said system comprising:
    at least one active or passive sensor operable to detect an object;
    a first warning device including an active material element operable to undergo a reversible change in property when exposed to or occluded from an activation signal, wherein the change causes a haptic alert to be produced;
    a steering wheel angle sensor operable to detect the direction of rotation of the wheel; and
    a controller communicatively coupled to the active material element and steering wheel angle sensors and device, and configured to produce the activation signal, when the object is detected and the steering wheel sensor indicates rotation of the wheel towards the object, so as to cause the haptic alert to be produced; wherein the device includes an Magneto-Rheological Hydraulic Power Steering system, the element is Magneto-Rheological fluid housed and circulated within the MR-HPS system, and the device is configured to change the viscosity of the fluid when the signal is generated.

16. The system as claimed in claim 15, further comprising:
    a second warning device including a human-vehicle interface monitor and configured to selectively display a visible alert.

17. The system as claimed in claim 15, wherein said at least one active sensor is a lidar or radar device including a signal processing unit.

18. A method of alerting an operator of a vehicle to an impending improper lane change, wherein said vehicle includes a module engaged by the operator, said method comprising:
    a. securing an active material element, operable to undergo a reversible change in property when exposed to or occluded from an activation signal, so as to be activated and deactivated respectively, relative to the module, such that a reversible characteristic of the element causes a module condition detectable by the operator;
    b. determining the position of an approaching object in the direction of host vehicle travel in an adjacent lanes, or of a lane-marking, relative to the host vehicle, so as to determine a spatial relationship between the approaching object in the direction of host vehicle travel in adjacent lane, or the lane marking, and the host vehicle;
c. comparing the relationship to a threshold, generating an activation signal when the relationship exceeds the threshold, and transmitting the signal, so as to activate the element;
d. changing the characteristic by activating the element, and modifying the module condition by changing the characteristic; and
e. alerting the operator through the change in module condition; and
f. wherein the module includes an Magneto-Rheological Hydraulic Power Steering system, the element is Magneto-Rheological fluid housed and circulated within the MR-HPS system, and the module is configured to change the viscosity of the fluid when the signal is generated.

* * * * *